(12) United States Patent
Garner

(10) Patent No.: US 10,837,316 B2
(45) Date of Patent: Nov. 17, 2020

(54) HIGH THERMAL RESPONSE EXHAUST DIFFUSER STRUT COLLAR

(71) Applicant: DOOSAN HEAVY INDUSTRIES & CONSTRUCTION CO., LTD., Changwon-si (KR)

(72) Inventor: Chad Garner, Jupiter, FL (US)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 169 days.

(21) Appl. No.: 15/960,905

(22) Filed: Apr. 24, 2018

(65) Prior Publication Data

US 2019/0063259 A1 Feb. 28, 2019

Related U.S. Application Data

(60) Provisional application No. 62/550,228, filed on Aug. 25, 2017.

(51) Int. Cl.
| | |
|---|---|
| *F01D 25/14* | (2006.01) |
| *F01D 25/24* | (2006.01) |
| *F02C 3/06* | (2006.01) |
| *F01D 9/06* | (2006.01) |
| *F01D 25/30* | (2006.01) |
| *F01D 25/16* | (2006.01) |
| *F01D 25/12* | (2006.01) |

(52) U.S. Cl.
CPC ........... *F01D 25/145* (2013.01); *F01D 9/065* (2013.01); *F01D 25/12* (2013.01); *F01D 25/162* (2013.01); *F01D 25/24* (2013.01); *F01D 25/30* (2013.01); *F02C 3/06* (2013.01); *F05D 2220/32* (2013.01); *F05D 2230/31* (2013.01); *F05D 2240/15* (2013.01); *F05D 2250/11* (2013.01)

(58) Field of Classification Search
CPC ...... F01D 25/145; F01D 25/12; F01D 25/162; F01D 25/24; F01D 25/30; F01D 9/065; F02C 3/06; F05D 2250/11
See application file for complete search history.

(56) References Cited

U.S. PATENT DOCUMENTS 4,993,918 A * 2/1991 Myers ............... F01D 9/065
    415/191
5,609,467 A   3/1997 Lenhart et al.
(Continued)

FOREIGN PATENT DOCUMENTS

| JP | 2002213209 A | 7/2002 |
| JP | 6142000 B2 | 6/2017 |

OTHER PUBLICATIONS

A Korean Office Action dated Jul. 12, 2019 in connection with Korean Patent Application No. 10-2018-0061652 which corresponds to the above-referenced U.S. application.

*Primary Examiner* — Carlos A Rivera
(74) *Attorney, Agent, or Firm* — Invenstone Patent, LLC

(57) ABSTRACT

A strut shield collar can include: a tubular portion including a tubular inside surface and a tubular outside surface; a flange portion extended from the tubular portion toward an outside of the tubular portion and including a flange inside surface; and a grid type mesh formed on at least one of the tubular inside surface and the flange inside surface, wherein the grid type mesh comprises a groove portion and a rib portion, and the groove portion is thinner than the rib portion.

15 Claims, 10 Drawing Sheets

(56) References Cited

U.S. PATENT DOCUMENTS

| | | | |
|---|---|---|---|
| 6,412,268 B1 * | 7/2002 | Cromer | F01D 9/023 60/760 |
| 6,553,665 B2 * | 4/2003 | Gunn | B23K 9/0026 29/889.21 |
| 6,984,102 B2 * | 1/2006 | Bunker | F01D 5/187 415/115 |
| 7,011,502 B2 | 3/2006 | Lee et al. | |
| 10,094,285 B2 | 10/2018 | Munshi et al. | |
| 2013/0064647 A1 * | 3/2013 | Hashimoto | F01D 25/14 415/116 |
| 2014/0286763 A1 * | 9/2014 | Munshi | F02C 7/12 415/178 |
| 2015/0040393 A1 | 2/2015 | Shteyman et al. | |
| 2015/0044046 A1 * | 2/2015 | Shteyman | F01D 25/30 416/95 |
| 2015/0337687 A1 * | 11/2015 | Scott | F02C 7/20 415/215.1 |
| 2017/0211424 A1 * | 7/2017 | Takeda | F01D 9/065 |

* cited by examiner

HIGH THERMAL RESPONSE EXHAUST DIFFUSER STRUT COLLAR

CROSS-REFERENCE TO RELATED APPLICATION

This application claims the benefit of U.S. Provisional Application Ser. No. 62/550,228, filed Aug. 25, 2017, which is incorporated herein by reference in its entirety.

BACKGROUND OF THE INVENTION

A gas turbine generally comprises a compressor, a combustor, and a turbine. The compressor provides compressed air generated by a plurality of compressor blades to the combustor, wherein the compressed air is high-temperature and high-pressure air. The combustor mixes the compressed air, introduced from the compressor, with fuel and combusts the mixed air. The combusted gas generated from the combustor is discharged to the turbine and a turbine blade of the turbine is rotated by the combusted gas, thereby generating power. The generated power is used in various fields such as for the generation of electricity and to drive machinery. The gas turbine is used to drive a generator, an aircraft, a locomotive, and the like.

One of important factors of the gas turbine is how to discharge the combusted gas to the outside, thus an exhaust diffuser is disposed on the turbine to exhaust the combusted gas. However, a strut shield collar of the exhaust diffuser is very large and thick, thus the thermal response is slow, thereby resulting in high cycle stress in the adjacent components. In addition, it is difficult to manufacture the strut shield collar by a conventional process such as casting or forming.

BRIEF SUMMARY

The present invention relates to an exhaust diffuser, more particularly, to a strut shield collar including a grid type mesh on an inside surface and a collar foot on the inside surface.

In many embodiments, the strut shield collar comprises a grid type mesh on an inside surface, thereby reducing mass while maintaining stiffness. In addition, the strut shield collar comprises a collar foot on the inside surface, thereby providing an additional welding point to a diffuser guide for additional stiffening.

In an embodiment of the present invention, a strut shield collar can include: a tubular portion including a tubular inside surface and a tubular outside surface; a flange portion extended from the tubular portion toward an outside of the tubular portion and including a flange inside surface; and a grid type mesh formed on at least one of the tubular inside surface and the flange inside surface.

In another embodiment of the present invention, a strut shield collar can include: a tube including an inside surface and an outside surface; and a grid type mesh formed on the inside surface; wherein the tube comprises a first hole at a first distal end and a second hole at a second distal end, and wherein a size of an inside of the tube increases from the first hole to the second hole.

In yet another embodiment of the present invention, a strut shield collar can include: a tubular portion including a tubular inside surface; a flange portion extended from the tubular portion toward an outside of the tubular portion and including a flange inside surface; a grid type mesh formed on at least one of the tubular inside surface and the flange inside surface; and a collar foot formed on the flange inside surface.

DETAILED DISCLOSURE

Figure 1:
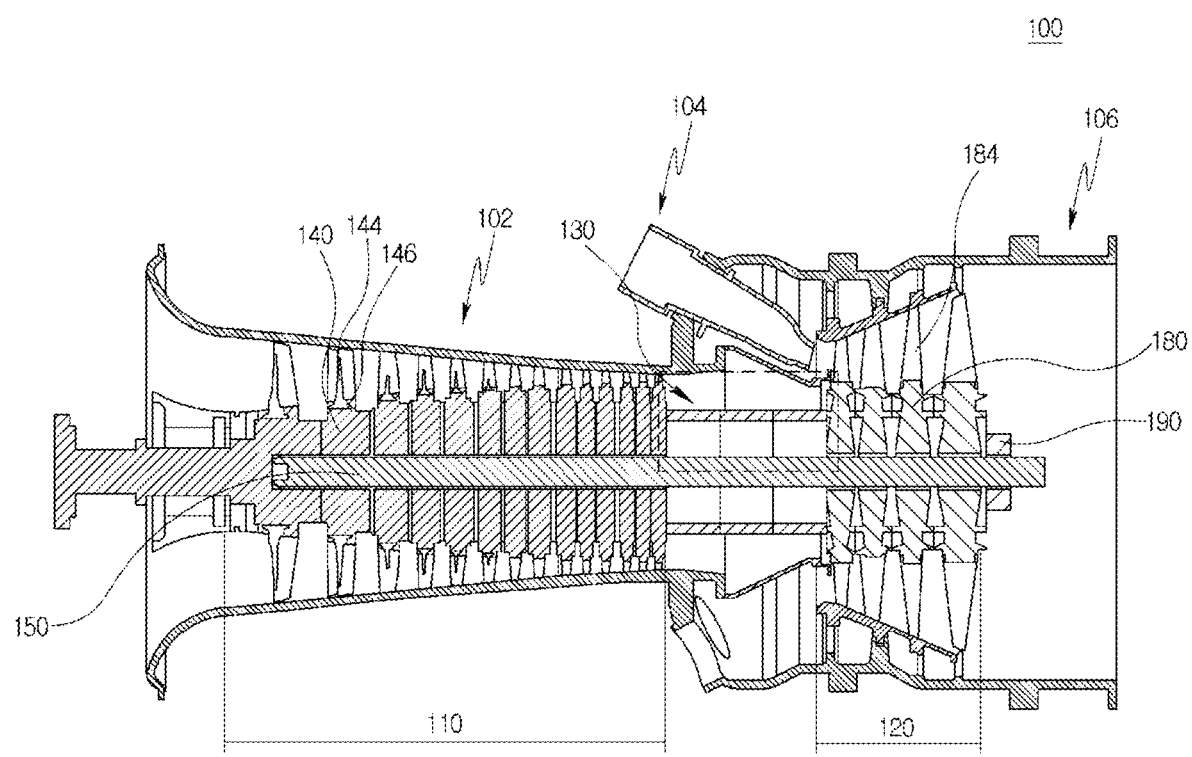
FIG. 1 shows a cross-sectional view of a gas turbine according to an embodiment of the present invention.

When the terms "on" or "over" are used herein, when referring to layers, regions, patterns, or structures, it is understood that the layer, region, pattern, or structure can be directly on another layer or structure, or intervening layers, regions, patterns, or structures may also be present. When the terms "under" or "below" are used herein, when referring to layers, regions, patterns, or structures, it is understood that the layer, region, pattern, or structure can be directly under the other layer or structure, or intervening layers, regions, patterns, or structures may also be present. The terms "includes" and "including" are equivalent to "comprises" and "comprising", respectively.

In addition, references to "first", "second", and the like (e.g., first and second portion), as used herein, and unless otherwise specifically stated, are intended to identify a particular feature of which there may be more than one. Such reference to "first" does not imply that there must be two or more. These references are not intended to confer any order in time, structural orientation, or sidedness (e.g., left or right) with respect to a particular feature, unless explicitly stated. In addition, the terms "first" and "second" can be selectively or exchangeably used for the members.

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, a dimension of each of the elements may be exaggerated for clarity of illustration, and the dimension of each of the elements may be different from an actual dimension of each of the elements. Not all elements illustrated in the drawings must be included and limited to the present disclosure, but the elements except essential features of the present disclosure may be added or deleted.

It is to be understood that the figures and descriptions of embodiments of the present invention have been simplified to illustrate elements that are relevant for a clear understanding of the invention, while eliminating (in certain cases), for purposes of clarity, other elements that may be well known. Those of ordinary skill in the art will recognize that other elements may be desirable and/or required in order to implement the present invention. However, because such elements are well known in the art, and because they do not facilitate a better understanding of the present invention, a discussion of such elements is not provided herein.

Reference will be made to the attached figures on which the same reference numerals are used throughout to indicate the same or similar components. FIG. 1 shows a cross-sectional view of a gas turbine according to an embodiment of the present invention. Referring to FIG. 1, the gas turbine 100 according to an embodiment of the present invention comprises a compressor 110, a combustor 104, a turbine 120, a housing 102, and an exhaust diffuser 106.

The housing 102 covers the compressor 110 and the compressor 110 provides compressed air to the combustor 104. The combustor 104 generates hot gas using the compressed air and provides the hot gas to the turbine 120. The turbine 120 generates a rotation torque by using the hot gas provided by the combustor 104. The exhaust diffuser 106 is placed behind the turbine 120 and broadens the hot gas and reduces its speed. The gas turbine 100 further comprises a torque tube 130 between the compressor 110 and the turbine 120 in order to transfer the rotation torque generated by the turbine 120 to the compressor 110.

The compressor 110 includes a plurality of compressor blades 144, which are arranged on a plurality of compressor rotor disks 140 in a radial fashion. Each of the plurality of compressor blades 144 includes a compressor blade root 146 configured to be coupled with the compressor rotor disk 140 via a dove tail shape or a fir tree shape. The compressor 110 rotates the plurality of compressor blades 144, and air is thus moved while being compressed due to the rotation of the plurality of compressor blades 144. In an embodiment, the compressor 110 may be directly or indirectly connected to the turbine 120 so as to receive some of the power generated by the turbine 120, which is in turn used to rotate the plurality of compressor blades 144.

The air compressed in the compressor 110 is moved to the combustor 104. The combustor 104 includes a plurality of casings and a plurality of burners, which are arranged in a circular pattern. The combustor 104 comprises a combustion chamber defined by a liner, and fuel is provided through a fuel nozzle to the combustion chamber of the combustor 104. The compressed air is mixed with the fuel and then is combusted in the combustion chamber. Subsequently, the combusted hot gas is discharged to the turbine 120 so as to rotate a turbine blade 184 attached on a turbine rotor disk 180.

The gas turbine 100 further comprises a tie bolt 150 that is arranged to pass through the turbine rotor disk 180 and the compressor rotor disk 140. A first distal end of the tie bolt 150 is attached to a first compressor rotor disk of the plurality of compressor rotor disks 140 and a second distal end of the tie bolt 150 is fixed by a fixing nut 190. Facing surfaces of adjacent compressor rotor disks are compressed by the tie bolt 150 such that the adjacent compressor rotor disks do not rotate individually. The gas turbine 100 can comprise a vane attached on the housing 102 and placed between the plurality of compressor rotor disks 140.

The turbine 120 comprises the plurality of turbine rotor disks 180 and the plurality of turbine blades 184 coupled with the turbine rotor disk 180. Similar to the plurality of compressor blades 144, the plurality of turbine blades 184 are arranged on the turbine rotor disk 180 in a radial fashion. In addition, the plurality of turbine blades 184 are assembled to the turbine rotor disk 180 through a dove tail joint or a fir tree joint.

The combusted hot gas passes through the turbine 120 and is exhausted from the turbine 120. The exhausted gas passes through the exhaust diffuser 106 disposed behind the turbine 120 and then finally flows out. That is, the exhaust diffuser 106 receives the exhausted gas from the turbine 120 and then ejects the exhaust gas to the outside of the gas turbine 100.

Figure 2:
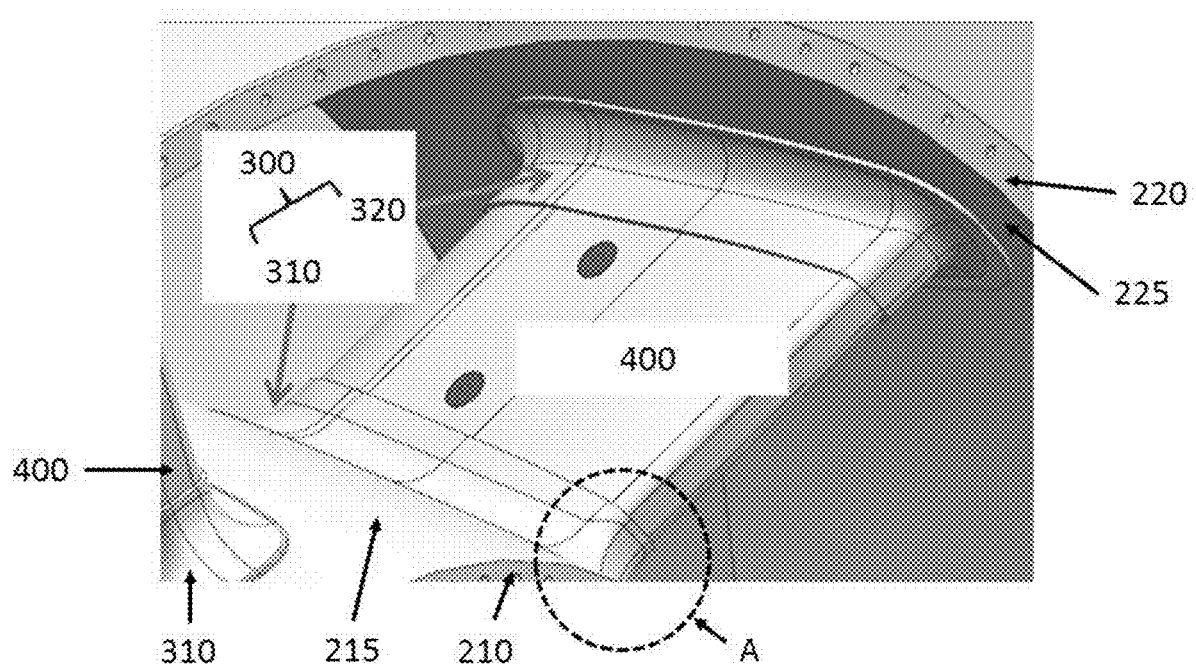
FIG. 2 shows a perspective view of an exhaust diffuser according to an embodiment of the present invention.
Figure 3:
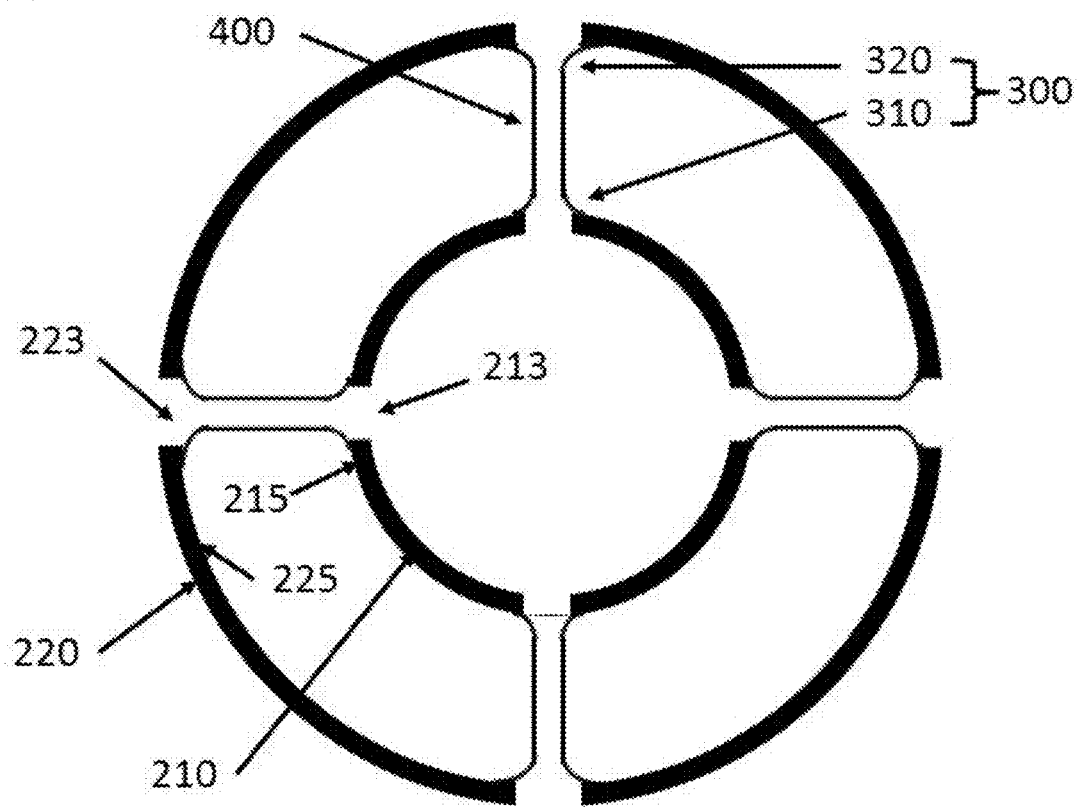
FIG. 3 shows a cross-sectional view of an exhaust diffuser according to an embodiment of the present invention.

FIG. 2 shows a perspective view of an exhaust diffuser according to an embodiment of the present invention. FIG. 3 shows a cross-sectional view of an exhaust diffuser according to an embodiment of the present invention. Referring to FIGS. 2 and 3, the exhaust diffuser 106 comprises an inner diffuser guide 210 and an outer diffuser guide 220. The inner 210 and outer 220 diffuser guides have a cylinder shape, and the inner diffuser guide 210 is disposed inside the outer diffuser guide 220.

The inner diffuser guide 210 and the outer diffuser guide 220 have an inner diffuser guide hole 213 and an outer diffuser guide hole 223, respectively, and the inner diffuser guide hole 213 and the outer diffuser guide hole 223 are connected to each other through a strut shield 400. The exhaust diffuser 106 further comprises a strut shield collar 300 including an inner strut shield collar 310 and an outer strut shield collar 320. The inner strut shield collar 310 connects an outer surface 215 of the inner diffuser guide 210 to the strut shield 400, and the outer strut shield collar 320 connects an inner surface 225 of the outer diffuser guide 220 to the strut shield 400. Thus, the outer diffuser guide hole 223 corresponds to the inner diffuser guide hole 213, and a passage is formed form the inner diffuser guide hole 213 to the outer diffuser guide hole 223 through the inner strut shield collar 310, the strut shield 400, and the outer strut shield collar 320.

Figure 4:
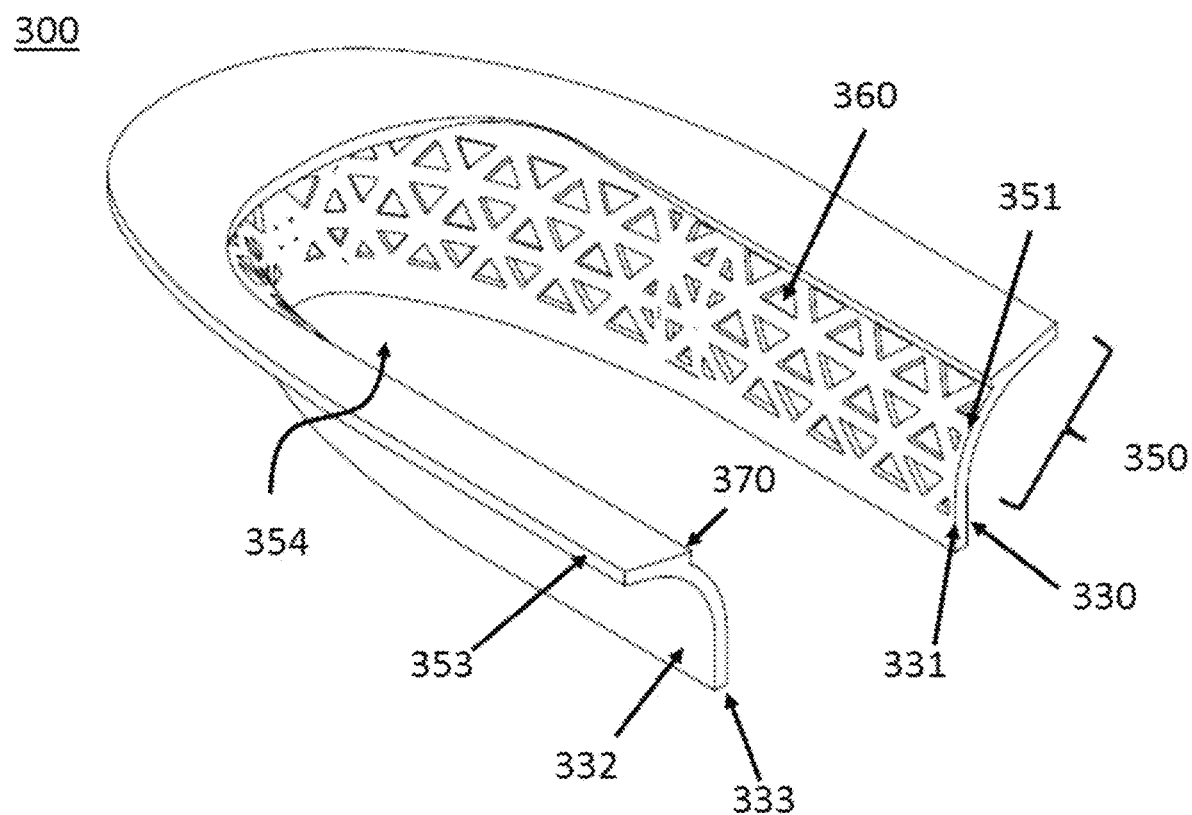
FIG. 4 shows a perspective view of a strut shield collar according to an embodiment of the present invention.
Figure 5:
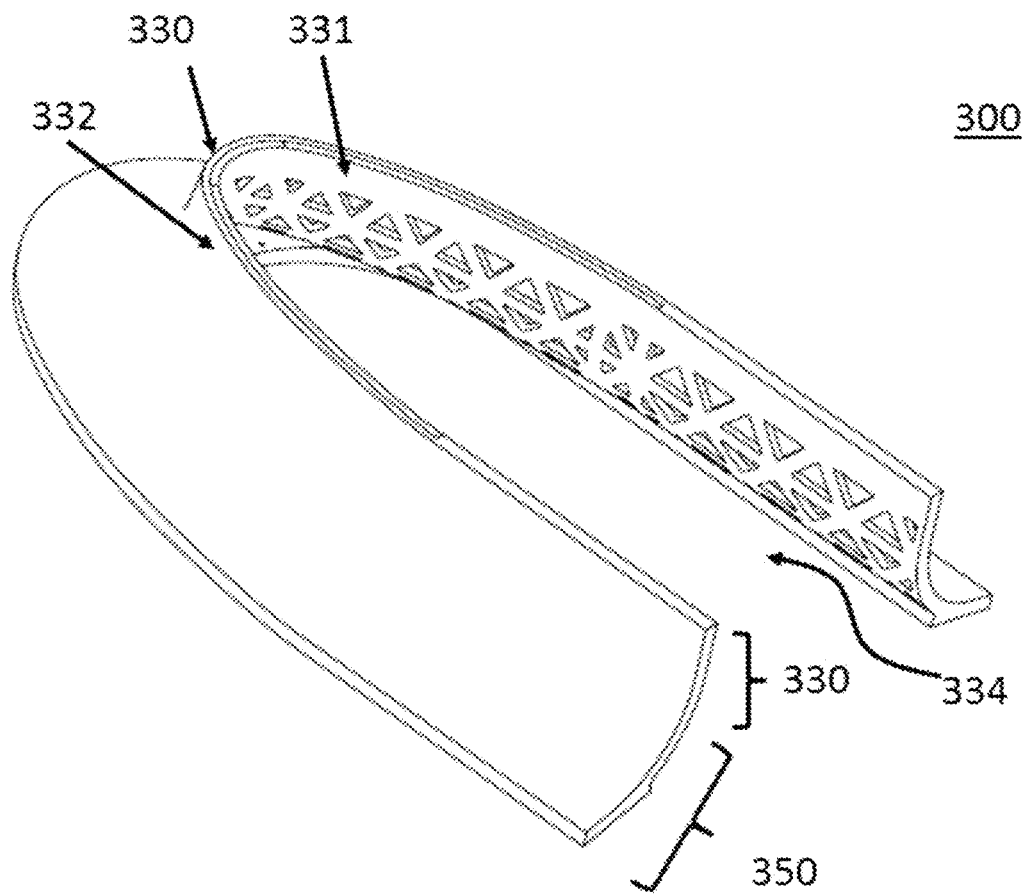
FIG. 5 shows a perspective view of a strut shield collar according to an embodiment of the present invention.
Figure 6:
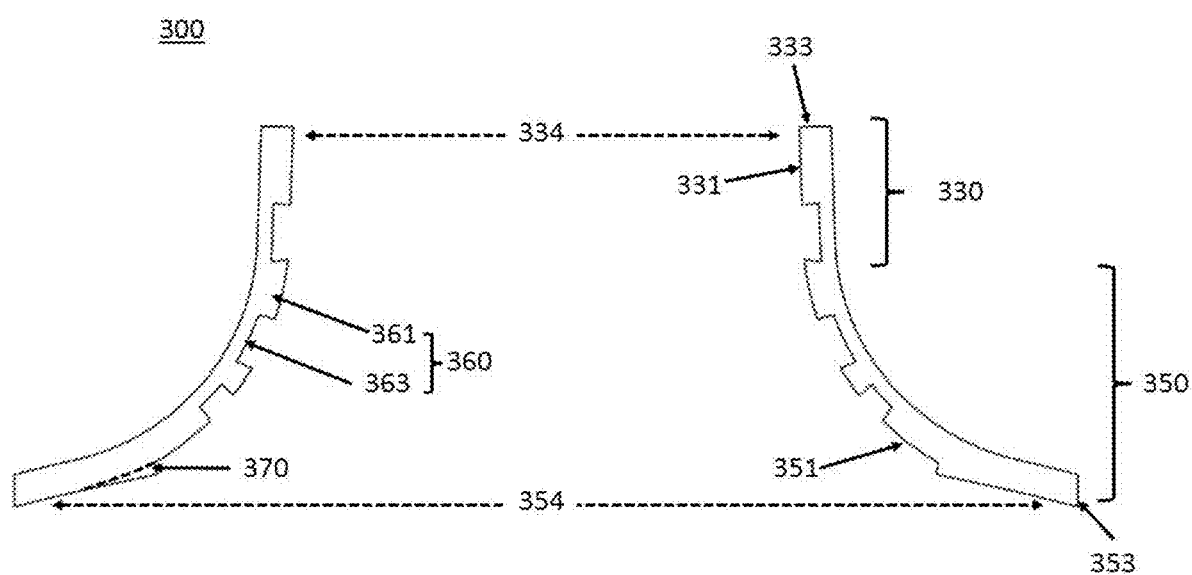
FIG. 6 shows a cross-sectional view of a strut shield collar according to an embodiment of the present invention.

FIGS. 4 and 5 show perspective views of a strut shield collar according to an embodiment of the present invention. FIG. 4 and FIG. 5 show half the strut shield collar shown from a bottom and a top, respectively. FIG. 6 shows a cross-sectional view of a strut shield collar according to an embodiment of the present invention. Referring to FIGS. 4-6, the strut shield collar 300 comprises a tube including an inside surface and an outside surface. In particular, the strut shield collar 300 comprises a tubular portion 330 including a tubular inside surface 331 and a tubular outside surface 332, and a flange portion 350 extended from the tubular portion 330 toward an outside of the tubular portion 330.

The tubular portion 330 includes a tubular hole 334 at a tubular distal end 333 and the flange portion 350 includes a flange hole 354 at a flange distal end 353. Since the flange portion 350 is extended toward the outside of the tubular portion 330, a size of the flange hole 354 is larger than that of the tubular hole 334. That is, a size of the inside of the strut shield collar 300 increases gradually from the tubular hole 334 to the flange hole 354.

The strut shield collar 300 comprises a grid type mesh 360 formed on the tubular inside surface 331 or a flange inside surface 351. The grid type mesh 360 comprises a rib portion 361 and a groove portion 363, wherein the groove portion 363 is thinner than the rib portion 361. The rib portion 361 surrounds the groove portion 363. When the groove portion 363 has a plurality of grooves, the rib portions 361 surrounding each of the plurality of grooves are connected to each other. As a result, the thinner groove portion 363 of the strut shield collar 300 reduces mass of the strut shield collar 300 and the thicker rib portion 361 maintains stiffness of the strut shield collar 300. The grid type mesh 360 can be formed on one of the tubular inside surface 331 and the flange inside surface 351, or on both of the tubular inside surface 331 and the flange inside surface 351.

The strut shield collar 300 further comprises a collar foot 370 on the flange inside surface 351. The collar foot 370 is extended from the flange inside surface 351 toward an inside of the flange portion 350. This collar foot 370 increases a thickness of the flange portion 350 and increases a surface to face a diffuser guide.

Figure 7:
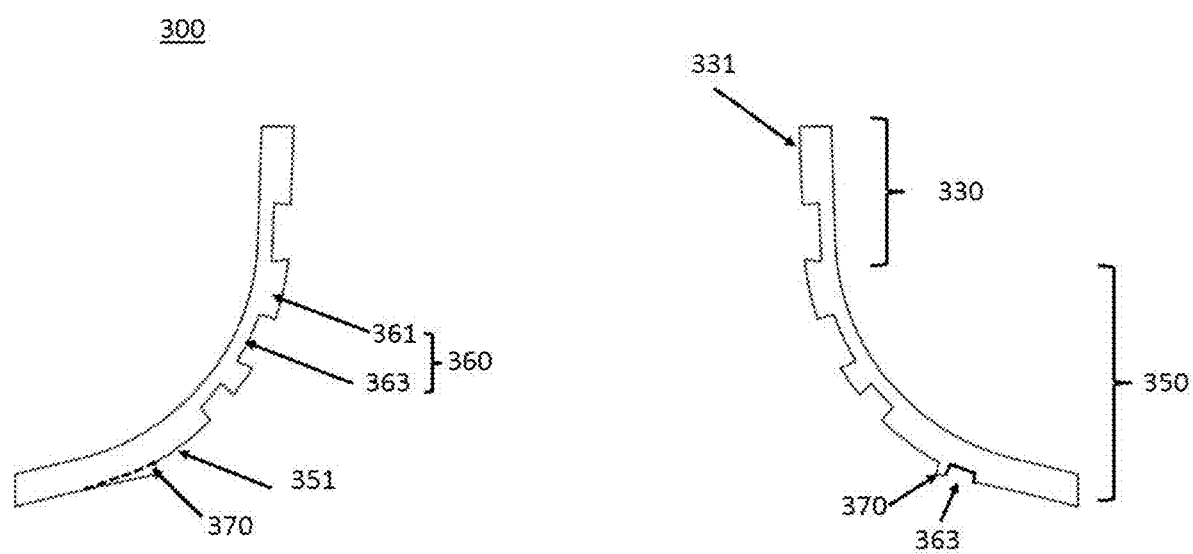
FIG. 7 shows a cross-sectional view of a strut shield collar according to an embodiment of the present invention.

FIG. 7 shows a cross-sectional view of a strut shield collar according to an embodiment of the present invention. Referring to FIG. 7, the groove portion 363 of the grid type mesh 360 is formed on the collar foot 370. Thus, even if the collar foot 370 is additionally formed on the strut shield collar 300, the grid type mesh 360 inhibits the total mass from increasing.

Figure 8:
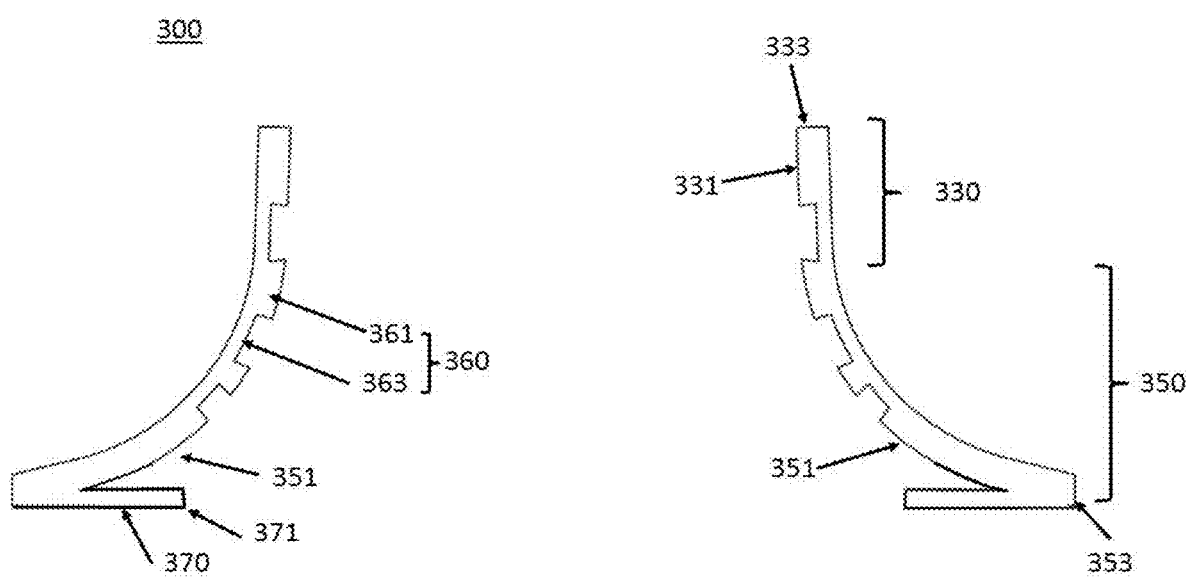
FIG. 8 shows a cross-sectional view of a strut shield collar according to an embodiment of the present invention.

FIG. 8 shows a cross-sectional view of a strut shield collar according to an embodiment of the present invention. Referring to FIG. 8, the collar foot 370 is extended from the flange distal end 353 toward the inside of the flange portion 350 and a collar foot distal end 371 of the collar foot 370 is spaced apart from the flange inside surface 351.

Figure 9:
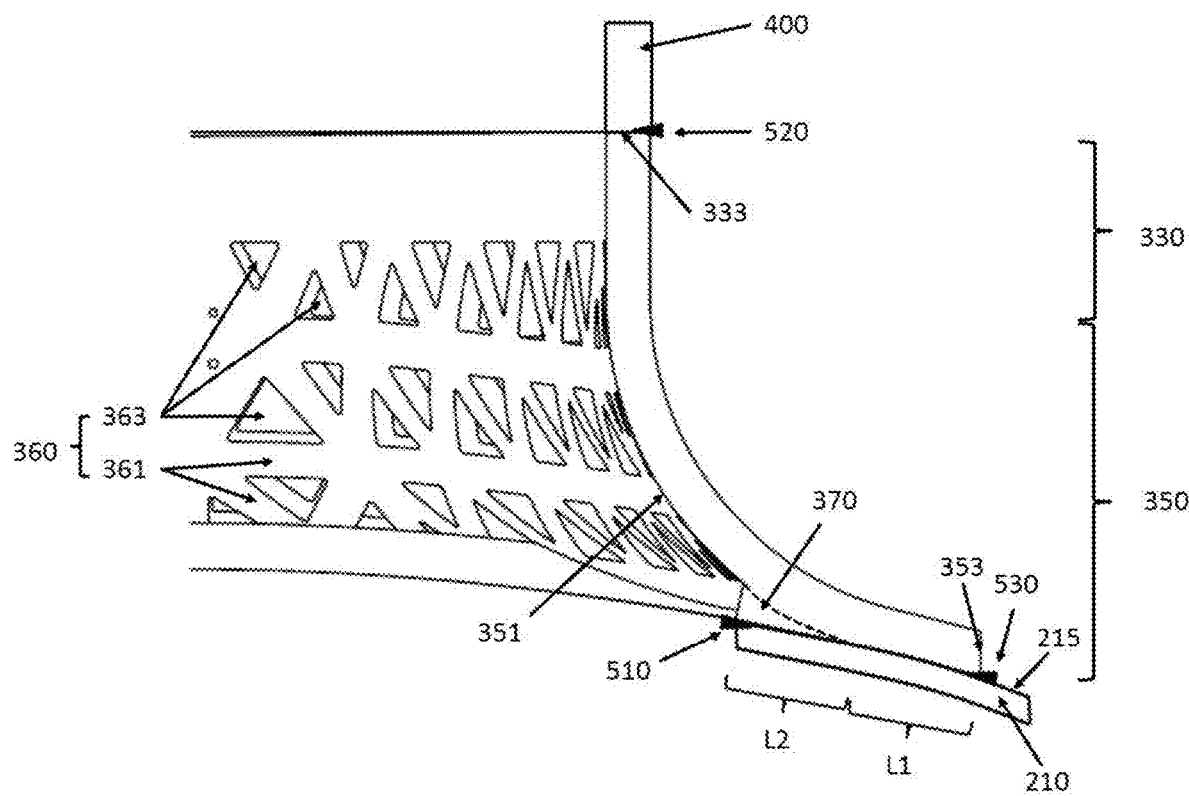
FIG. 9 shows a partial perspective view of "A" portion of FIG. 2 according to an embodiment of the present invention.

FIG. 9 shows a partial perspective view of "A" portion of FIG. 2 according to an embodiment of the present invention. Referring to FIG. 9, the flange inside surface 351 of the flange portion 350 is in contact with the outer surface 215 of the inner diffuser guide 210 in a range of first distance L1, and the collar foot 370 is additionally in contact with the outer surface 215 in a range of second distance L2. The collar foot 370 is connected to the outer surface 215 of the inner diffuser guide 210 by a first weld 510. That is, the collar foot 370 increases a contact surface with respect to the outer surface 215 of the inner diffuser guide 210 and provides an additional welding point to the inner diffuser guide 210. The inner diffuser guide 210 is also attached onto the flange portion 350 by a third weld 530 formed between the flange distal end 353 and the outer surface 215 of the inner diffuser guide 210. In addition, the strut shield 400 is connected to the tubular portion 330 by a second weld 520 formed between the tubular distal end 333 and the strut shield 400.

Figure 10:
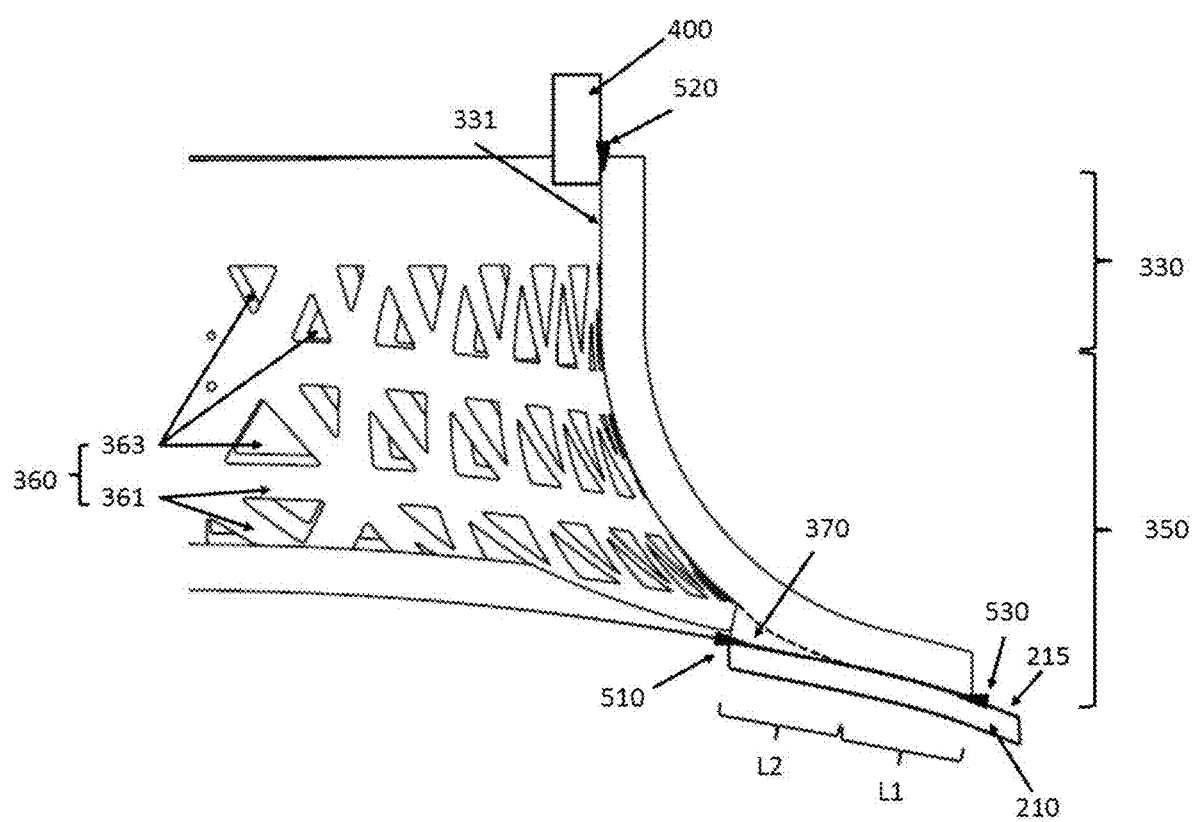
FIG. 10 shows a partial perspective view of "A" portion of FIG. 2 according to an embodiment of the present invention.

FIG. 10 shows a partial perspective view of "A" portion of FIG. 2 according to an embodiment of the present invention. Referring to FIG. 10, the strut shield 400 is inserted into the inside of the tubular portion 330, and the strut shield 400 is connected to the tubular inside surface 331 by the second weld 520.

The strut shield collar according to an embodiment of the subject invention can be formed by a conventional casting method or forming method. In addition, the grid type mesh or the collar foot of the strut shield collar can be formed on the inside surface of the previously manufactured strut shied collar by an additive manufacturing method such as a selective laser melting (SLM), a direct metal deposition (DMD), or a Powdered Bed Type (DMLM).

The subject invention includes, but is not limited to, the following exemplified embodiments.

Embodiment 1

A strut shield collar, comprising:
a tubular portion including a tubular inside surface and a tubular outside surface;
a flange portion extended from the tubular portion toward an outside of the tubular portion and including a flange inside surface; and
a grid type mesh formed on at least one of the tubular inside surface and the flange inside surface.

Embodiment 2

The strut shield collar according to embodiment 1, wherein the grid type mesh comprises a groove portion and a rib portion, and the groove portion is thinner than the rib portion.

Embodiment 3

The strut shield collar according to embodiment 2, wherein the rib portion surrounds the groove portion.

Embodiment 4

The strut shield collar according to any of embodiments 1-3, further comprising a collar foot extended from the flange inside surface toward an inside of the flange portion.

Embodiment 5

The strut shield collar according to embodiment 4, wherein the grid type mesh is formed on the collar foot.

Embodiment 6

An exhaust diffuser, comprising:
the strut shield collar according to any of embodiments 1-5;
a diffuser guide including a diffuser guide hole corresponding to the inside of the flange portion; and
a strut shield connected to the tubular portion,
wherein the collar foot and the diffuser guide are connected to each other by a first weld.

Embodiment 7

The exhaust diffuser according to embodiment 6, wherein the strut shield is connected to a distal end of the tubular portion by a second weld.

Embodiment 8

The exhaust diffuser according to embodiment 6, wherein the strut shield is connected to the tubular inside surface of the tubular portion by a second weld.

Embodiment 9

A gas turbine, comprising:
a compressor providing compressed air;
a combustor receiving the compressed air and producing combusted gas;
a turbine receiving the combusted gas from the combustor; and
the exhaust diffuser according to any of embodiments 6-8,
wherein the exhaust diffuser is disposed behind the turbine and receives the combusted gas passing through the turbine.

Embodiment 10

A strut shield collar, comprising:
a tube including an inside surface and an outside surface;

a grid type mesh formed on the inside surface;
wherein the tube comprises a first hole at a first distal end and a second hole at a second distal end, and
wherein a size of an inside of the tube increases from the first hole to the second hole;

Embodiment 11

The strut shield collar according to embodiment 10, wherein the grid type mesh comprises a groove portion and a rib portion, and the groove portion is thinner than the rib portion.

Embodiment 12

The strut shield collar according to any of embodiments 10-11, further comprising a collar foot formed on the inside surface closer to the second hole than to the first hole.

Embodiment 13

The strut shield collar according to embodiment 12, wherein the grid type mesh is formed on the collar foot.

Embodiment 14

An exhaust diffuser, comprising:
an inner diffuser guide including an inner diffuser guide hole;
an outer diffuser guide including an outer diffuser guide hole;
a strut shield disposed between the inner diffuser guide hole and the outer diffuser guide hole; and
a plurality of strut shield collars according to any of embodiments 10-13,
wherein a first strut shield collar of the plurality of strut shield collars connects the inner diffuser guide with the strut shield, and
wherein a second strut shield collar of the plurality of strut shield collars connects the outer diffuser guide with the strut shield.

Embodiment 15

The exhaust diffuser according to embodiment 14, wherein an outer surface of the inner diffuser guide is in contact with the collar foot of the first strut shield collar.

Embodiment 16

The exhaust diffuser according to any of embodiments 14-15, wherein the inner diffuser guide and the collar foot of the first strut shield collar are connected to each other by a first weld.

Embodiment 17

A gas turbine, comprising:
a compressor providing compressed air;
a combustor receiving the compressed air and producing combusted gas;
a turbine receiving the combusted gas from the combustor; and
the exhaust diffuser according to any of embodiments 14-16,
wherein the exhaust diffuser is disposed behind the turbine such that an exhaust gas passes through the exhaust diffuser.

Embodiment 18

A strut shield collar, comprising:
a tubular portion including a tubular inside surface;
a flange portion extended from the tubular portion toward an outside of the tubular portion and including a flange inside surface;
a grid type mesh formed on at least one of the tubular inside surface and the flange inside surface; and
a collar foot formed on the flange inside surface.

Embodiment 19

The strut shield collar according to embodiment 18, wherein a distal end of the collar foot is spaced apart from the flange inside surface.

Embodiment 20

The strut shield collar according to any of embodiments 18-19, wherein the grid type mesh comprises a groove portion and a rib portion, and the groove portion is thinner than the rib portion Embodiment 21

A method of manufacturing a strut shield collar, comprising:
casting a strut shield collar,
wherein the strut shield collar comprises:
a tubular portion including a tubular inside surface and a tubular outside surface;
a flange portion extended from the tubular portion toward an outside of the tubular portion and including a flange inside surface;
a grid type mesh formed on at least one of the tubular inside surface and the flange inside surface; and
a collar foot formed on the flange inside surface.

Embodiment 22

A method of manufacturing an exhaust diffuser, comprising:
preparing the strut shield collar manufactured according to embodiment 21; and
welding the collar foot and a diffuser guide.

Embodiment 23

The method according to embodiment 22, further comprising welding the tubular portion and a strut shield.

Embodiment 24

The method according to any of embodiments 22-23, further comprising welding a distal end of the flange portion and the diffuser guide.

Embodiment 25

A method of manufacturing a strut shield collar, comprising:
casting a strut shield collar, adding a rib portion on an inside surface of the strut shield collar by a selective laser melting.

Embodiment 26

A method of manufacturing a strut shield collar, comprising:
casting a strut shield collar,
forming a groove portion on an inside surface of the strut shield collar by etching the inside surface.

It should be understood that the examples and embodiments described herein are for illustrative purposes only and that various modifications or changes in light thereof will be suggested to persons skilled in the art and are to be included within the spirit and purview of this application. Thus, the invention is not intended to limit the examples described herein, but is to be accorded the widest scope consistent with the principles and novel features disclosed herein.

What is claimed is:

1. A strut shield collar, comprising:
a tubular portion including a tubular inside surface and a tubular outside surface;
a flange portion extended from the tubular portion toward an outside of the tubular portion and including a flange inside surface; and
a grid type mesh formed on at least one of the tubular inside surface and the flange inside surface, the grid type mesh comprising:
a groove portion including a plurality of recesses each formed in the at least one of the tubular inside surface and the flange inside surface; and
a rib portion that is thicker than the groove portion and surrounds the groove portion,
wherein each of the plurality of recesses of the groove portion has a polygonal shape, and
wherein the rib portion includes straight sides extending from the at least one of the tubular inside surface and the flange inside surface to a bottom surface of the groove portion, the straight sides of the rib portion respectively forming each side of the polygonal shape of each of the plurality of polygonal recesses.

2. The strut shield collar according to claim 1, wherein each of the plurality of polygonal recesses is triangular in shape such that three straight sides of the straight sides of the rib portion respectively form the sides of the triangular shape of each of the plurality of polygonal recesses.

3. The strut shield collar according to claim 1, further comprising a collar foot extended from the flange inside surface toward an inside of the flange portion,
wherein the flange portion includes a first end extended from the tubular portion and a second end disposed toward the outside of the tubular portion, the flange inside surface extending from the first end to the second end, and
wherein the collar foot extends from the second end of the flange inside surface and protrudes into the inside of the flange portion.

4. The strut shield collar according to claim 3, wherein the grid type mesh is formed on the collar foot.

5. An exhaust diffuser, comprising:
the strut shield collar according to claim 3;
a diffuser guide including a diffuser guide hole corresponding to the inside of the flange portion; and
a strut shield connected to the tubular portion,
wherein the collar foot and the diffuser guide are connected to each other by a first weld.

6. The exhaust diffuser according to claim 5, wherein the strut shield is connected to a distal end of the tubular portion by a second weld.

7. A gas turbine, comprising:
a compressor providing compressed air;
a combustor receiving the compressed air and producing combusted gas;
a turbine receiving the combusted gas from the combustor; and
the exhaust diffuser according to claim 5,
wherein the exhaust diffuser is disposed behind the turbine and receives the combusted gas passing through the turbine.

8. A strut shield collar, comprising:
a tube including an inside surface and an outside surface, each of the inside and outside surfaces communicating with a first hole formed at a first distal end of the tube and communicating with a second hole formed at a second distal end of the tube, the tube having an inside that increases in size from the first hole to the second hole; and
a grid type mesh formed on the inside surface of the tube, the grid type mesh comprising:
a groove portion including a plurality of recesses each formed in the inside surface of the tube; and
a rib portion that is thicker than the groove portion and surrounds the groove portion.

9. The strut shield collar according to claim 8,
wherein each of the plurality of recesses of the groove portion has a polygonal shape, and
wherein the rib portion includes straight sides extending from the inside surface of the tube to a bottom surface of the groove portion, the straight sides of the rib portion respectively forming each side of the polygonal shape of each of the plurality of polygonal recesses.

10. The strut shield collar according to claim 9, further comprising a collar foot formed on the inside surface closer to the second hole than to the first hole, the collar foot including a distal end that is spaced apart from the inside surface of the tube and protrudes into an inside of the tube.

11. The strut shield collar according to claim 10, wherein the grid type mesh is formed on the collar foot.

12. An exhaust diffuser, comprising:
an inner diffuser guide including an inner diffuser guide hole;
an outer diffuser guide including an outer diffuser guide hole;
a strut shield disposed between the inner diffuser guide hole and the outer diffuser guide hole; and
the strut shield collar according to claim 10,
wherein the strut shield collar consists of a plurality of strut shield collars, the plurality of strut shield collars including a first strut shield collar and a second strut shield collar; and
wherein the first strut shield collar connects the inner diffuser guide with the strut shield, and the second strut shield collar connects the outer diffuser guide with the strut shield.

13. The exhaust diffuser according to claim 12, wherein an outer surface of the inner diffuser guide is in contact with the collar foot of the first strut shield collar.

14. The exhaust diffuser according to claim 12, wherein the inner diffuser guide and the collar foot of the first strut shield collar are connected to each other by a first weld.

15. A gas turbine, comprising:
a compressor providing compressed air;

a combustor receiving the compressed air and producing combusted gas;
a turbine receiving the combusted gas from the combustor; and
the exhaust diffuser according to claim 12,
wherein the exhaust diffuser is disposed behind the turbine such that an exhaust gas passes through the exhaust diffuser.

\* \* \* \* \*